United States Patent [19]
Geuss

[11] Patent Number: 4,706,963
[45] Date of Patent: Nov. 17, 1987

[54] TARGET SYSTEM FOR USE IN INFRARED FIRING EXERCISES

[76] Inventor: Carlheinz Geuss, Thumbachstrasse 67, 8484 Grafenwöhr, Fed. Rep. of Germany

[21] Appl. No.: 792,978

[22] Filed: Oct. 30, 1985

[30] Foreign Application Priority Data

Oct. 30, 1984 [DE] Fed. Rep. of Germany ....... 3439689
Apr. 17, 1985 [DE] Fed. Rep. of Germany ....... 3513906
May 7, 1985 [DE] Fed. Rep. of Germany ....... 3516392

[51] Int. Cl.$^4$ .............................. F41J 1/08; F41J 9/13
[52] U.S. Cl. ................... 273/348.1; 269/236; 273/407; 439/263
[58] Field of Search ...................... 273/348.1, 408, 407; 269/236, 196; 339/75 MP

[56] References Cited

U.S. PATENT DOCUMENTS

| | | | |
|---|---|---|---|
| 299,931 | 4/1919 | Geisenhoner | 269/236 X |
| 586,359 | 7/1897 | Holt | 269/236 |
| 831,486 | 9/1906 | Taft | 269/236 X |
| 1,299,931 | 4/1919 | Geisenhoner | 269/236 XR |
| 912,989 | 6/1933 | McNair | 269/236 |
| 2,818,095 | 12/1957 | Stahl et al. | 269/196 X |
| 3,034,788 | 5/1962 | Cauble | 273/408 |
| 3,129,938 | 4/1964 | Riley | 269/236 X |
| 3,737,166 | 6/1973 | Knight | 273/407 X |
| 3,970,198 | 7/1976 | Prater | 339/75 MP X |
| 4,240,212 | 12/1980 | Marshall et al. | 273/348.1 |
| 4,370,012 | 1/1983 | Grabbe et al. | 339/75 MP |
| 4,405,132 | 9/1983 | Thalmann | 273/348.1 |
| 4,433,843 | 2/1984 | Bricco | 273/408 X |
| 4,486,061 | 12/1984 | Grabbe et al. | 339/75 MP |

FOREIGN PATENT DOCUMENTS 3205599 10/1983 Fed. Rep. of Germany ... 273/348.1

*Primary Examiner*—Paul E. Shapiro
*Attorney, Agent, or Firm*—Ratner & Prestia

[57] ABSTRACT

A target system for use in infrared firing exercises comprises a plurality of targets each of a wooden carrier material formed as a plate of a uniform thickness which is covered with a relatively thin metallic layer as an electrically conductive resistance material; a clamping device having two mutually adjustable clamping jaws for interchangeably holding these targets one at a time; and a source of current for electrically heating the metallic layer of each target when clamped at an edge portion between the two clamping jaws of the clamping device, whereby the current is provided with a downwardly transformed voltage for supplying a correspondingly upwardly transformed heating current to the metallic layer.

13 Claims, 5 Drawing Figures

TARGET SYSTEM FOR USE IN INFRARED FIRING EXERCISES

FIELD OF THE INVENTION

This invention relates to a target system for use in infrared firing exercises.

BACKGROUND ART

In the field of a military training program an infrared firing is usually exercised in which targets are used that must radiate a heat with a temperature of at least one degree Celsius higher than the temperature of the surrounding atmosphere. It otherwise will not be possible to recognize these targets with a night-sight view finder as thereby used by the gunners. This elevated temperature of such targets provides a thermal dummy or pseudo target for example of a tank which for which infrared firing exercises then requires the use of targets having the size of about 1.80 m×2.30 m in accordance with the relevant NATO regulations.

For allowing a plurality of shots the targets must of course maintain their elevated temperature over an extended time period starting with the primary heating of each target and its positioning into the firing direction. This positioning is usually done by means either of a stationary swinging mechanism that comprises a clamping device having two mutually adjustable clamping jaws for interchangeably holding the targets one at a time. With this swinging mechanism the targets are brought from a horizontal rest position into an upright position in which their heat radiation may be viewed by the gunners. An alternate positioning is carried out by means of carriages on which the targets are interchangeably held already in an upright position by means of a similar clamping device. The carriages are moved relative to the firing direction.

A prior art target of the kind as herein referred is described in German OS No. 32 05 599. A heat radiation suitable for infrared firing exercises is described as being obtainable by means of a carbon or graphite felt which is arranged on a presswood board for being heated by a current that is supplied to the felt at two opposite edge portions from either two serially connected 12 Volt batteries or from a 220 Volt line current source. These targets so far have only been used for observation and not for firing exercises because they could not fulfil the respective military requirements for the larger dimensioned thermal dummy or pseudo targets of tanks calling for a relatively short upheating period, the maintenance of a uniform and almost constant heat radiation over an extended time period for allowng a plurality of shots against such targets before their interchange, and also mainly calling for an easy handling of such targets in terms of their weight and their positioning in the firing direction of the gunners.

A further prior art target system of the kind herein referred is described in German Pat. No. 30 06 462. A heat radiation usable for infrared firing exercises is described as being obtainable by means of a flexible material composed of an aluminum foil as a heat absorbing layer, a plastic foil as a protective layer allowing the passage of the heating beams of a radiation apparatus, and of a coarse-meshed net which as an intermediate layer provides heat absorbing air chambers. This multi-layered material is fixed on a wooden frame for being heated by means of a radiation apparatus that is arranged in front of the assembly for a heating primarily of the aluminum foil. Although such targets are provided with an improved heat storage capacity maintainable over an extended period of time these targets as well have so far only seldomly been used for military training programs more or less for the same reasons as mentioned before.

This invention deals with the object of providing a target system for use in infrared firing exercises in which a thermal dummy or pseudo target is obtained by means of an electrical heating device in the form of an electrical conductive resistance material which when being heated with an improved power efficiency will perform a uniform heat radiation over an extended time period to thereby allow a multiple firing against such targets which for their heating to a temperature higher than the surrounding atmosphere shall also allow an easier and at the same time more safe-proof handling under consideration of their interchange on a clamping device of the target system.

This object of the present invention is accomplished by providing a target system that principally comprises a plurality of targets each of a wooden carrier material formed as a plate of a uniform thickness which is covered with a relatively thin metallic layer in the form of a sheet made of an aluminum alloy as laminated onto this wooden plate. Each of such targets is provided for being interchangeably held by a clamping device which is formed with two mutually adjustable clamping jaws of which at least one is provided with electrically conductive heating rails for supplying a heating current to the metallic layer of the target for its electrical heating by means of a heating circuit which comprises a current source and a transformer for downwardly transforming the voltage of the electrical current. The further main feature of the inventive target system is the provision of complementary curvatures for the surfaces of the two clamping jaws of the clamping device and the heating rails allow for larger dimensioned targets the use of a relatively thin plywood panel as a carrier material for the metallic layer used as an electric heating means.

DESCRIPTION OF THE INVENTION

For exercising a military infrared firing program the gunners concerned are using special nightsight view finders allowing them to observe for a multiple firing thermal dummy or pseudo targets that for this purpose must uniformly radiate a heat of at least one degree Celsius higher than the temperature of the surrounding atmosphere. The targets which for example simulate the contour of a tank are interchangeably held by a clamping device that forms a part either of a swinging mechanism rotating each target from a horizontal into an upright position or forming a part of a carriage serving to move the upright targets into the firing direction which is prescribed for the gunners.

Figure 1:
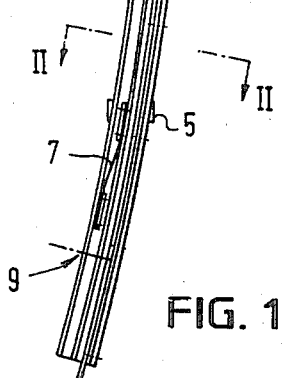
FIG. 1 is a plan view of a clamping device being formed with two clamping jaws that are provided with complementary curvatures between which an edge portion of larger sized targets may be clamped.
Figure 3:
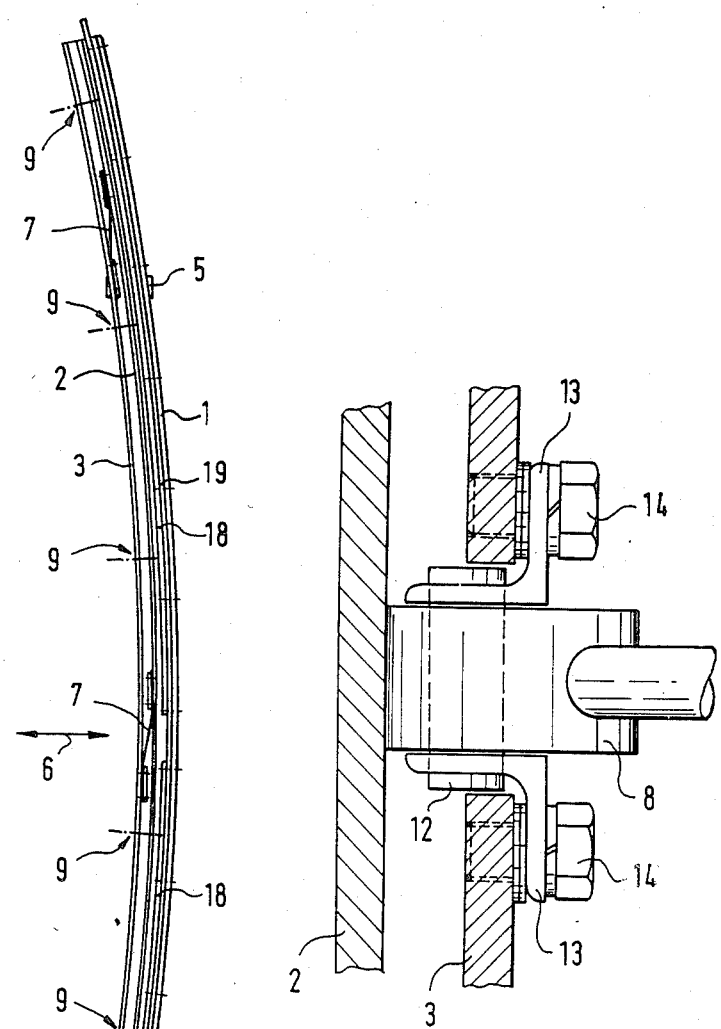
FIG. 3 is a plan view in the direction of the arrow A in FIG. 2 of a T-handle mechanism.
Figure 2:
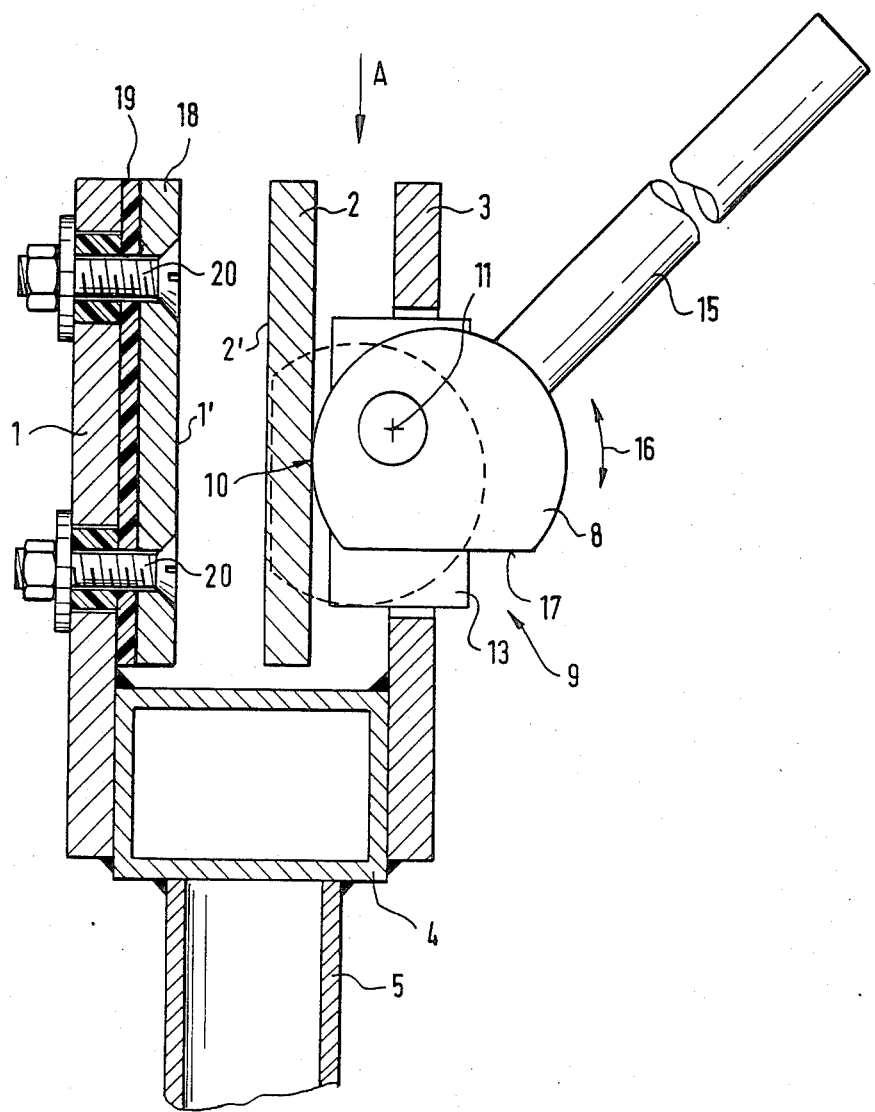
FIG. 2 is a sectional view of the clamping device taken along line II—II in FIG. 1 and shown in an enlarged scale.

In FIGS. 1 to 3 a clamping device is being shown which advantageously may be used for holding larger sized targets for example with the dimensions of 1.80 m×2.30 m which are used in infrared firing exercises for thermally simulating the contour of a tank. The clamping device is formed with two mutually adjustable clamping jaws 1,2 of which the one clamping jaw 1 is welded in common with a third jaw 3 extending in parallel to a support in the form of a bracket 4 having a hollow section. The bracket 4 is provided close to its two ends with two welded tubes 5 by means of which the entire clamping device may be fixed either to a carriage provided for moving the targets in an upright position into their firing line or fixed to a swinging mechanism provided for rotating the targets from a horizontal into an upright position at the location of a firing line.

The two clamping jaws 1,2 and the third jaw 3 are provided with the same length and the same contour. The one clamping jaw 2 has a smaller width than the other two jaws 1,3 with respect to which this clamping jaw 2 is relatively movable in the direction of the double arrow 6. The movable clamping jaw 2 is connected to the third jaw 3 by means of three regularly spaced leaf springs 7 which are either welded or screwed to these two jaws 2,3 in such a manner as to obtain a biased spread-apart position of the two clamping jaws 1,2 so that the jaw 2 for obtaining its clamping position must be moved towards the clamping jaw 1 against the common biasing force of all of these three leaf springs.

The leaf springs 7 are urging the clamping jaw 2 into a steady contact position with swivel members 8 of a plurality of six T-handle mechanisms 9 that are arranged on the jaw 3 at regular intervals. In the spread-apart position of the two clamping jaws 1,2 the swivel member 8 of all of these T-handle mechanisms 9 has a line contact 10 with the movable clamping jaw 2 as shown in FIG. 2. This line contact 10 is provided at a position below the relevant swivelling axis 11 of each swivel member 8. The swivelling axis 11 of each swivel member 8 is formed with an excentrically arranged bearing pin 12 which on its two ends is rotatably carried by two angle brackets 13 that are screwed to the jaw 3 by means of bolts 14 as shown in FIG. 3. This sectioned view also shows that the swivel member 8 of each T-handle mechanism 9 is carried by its bearing pin 12 in such a manner that by the one leg portion of the co-ordinated angle brackets 13 a guide will be provided for the swivel member 8 whenever the same is rotated around its swivelling axis. This rotation of the swivel member 8 of each T-handle mechanism 9 may be effected by means of a handle 15 which when actuated will rotate the swivel member 8 in the direction of the double arrow 16 to thereby obtain with the movable clamping jaw 2 either the line contact 10 or a planar contact with a flattening 17. The flattening 17 is on each swivel member 8 provided in such a manner than in its planar contact position as obtained with the relatively rotated position shown in FIG. 2 with dotted lines, the movable jaw 2 will be brought from a spread-apart position into a clamping position with respect to the clamping jaw 1 for a holding fast a target which then will be clamped by the two clamping jaws 1,2 at an edge portion that rests on the supporting bracket 4. The clamping gap existing between the two clamping jaws 1,2 in this clamping position of course is related to the thickness of the targets and is chosen such that each target will maintain a stable upright position over an extended period of an infrared firing exercise. The maintenance of such a stable upright position is enhanced by the planar contact of the flattening 17 with the movable jaw 2 as well as also by the excentric arrangement provided for the swivelling axis 11 of the swivel member 8 of all T-handle mechanisms 9.

The clamping jaw 1 which is welded to the supporting bracket 4 is provided with two copper rails 18 which together with an underlaying insulating layer 19 are fixed on the jaw 1 by means of screws 20. These copper rails 18 which alternatively may also be arranged on the movable clamping jaw 2 form the clamping face 1' of the jaw 1 which therefore is arranged opposite of the clamping face 2' of the movable clamping jaw 2. At least these two clamping faces 1',2' are now provided as shown in FIG. 1 with complementary curvatures extending over the entire length of the two clamping jaws 1,2 which in the shown embodiment of the clamping device are each provided with the same curvature as obtained by a rectangular cross-section. The complementary curvatures at least of the clamping faces 1',2' of the two clamping jaws 1,2 are chosen in such a manner that with a total length of 3.30 m of each clamping jaw 1,2 the two lateral edges of the same are displaced over about 12 cm relative to the convex centre line of each curvature. This displacement is measured in the direction of the double arrow 6 which according to the view shown in FIG. 1 corresponds with the direction of the mutual clamping adjustment of the two jaws 1,2. This specific curvature of the two clamping faces 1',2' uniformly extends along their entire clamping length at a right angle with respect to the direction of adjustment of the two jaws 1,2. It results in a clamping possibility of targets having the size of about 1.80 m×2.30 m and a uniform thickness of about 9 mm as obtained with a plywood panel as a wooden carrier material for a relatively thin metallic layer forming as will be explained an electrical conductive resistance material serving as a source of heat radiation. When these targets simulating the contour of a tank will be clamped with a longer edge portion between the two clamping jaws 1,2 it then will be experienced that the clamping forces which are applied by means of the multiple T-handle mechanisms 9 and the clamping jaws 1,2 to the clamped edge portion of a target will receive such a uniform distribution over the entire target that the curvature extending over the length of its clamped edge portion is more or less no longer present at the opposite free edge portion towards which this uniform distribution of the clamping forces at the same time creates a material-specific tensioning condition of such a value that the target will maintain a stable upright position under firing conditions even when its plywood panel is not provided with an additional stiffening framing. The curvature provided for the clamping faces of the clamping jaws therefore results in the advantages that larger sized targets may be manufactured from a relatively thin wooden carrier material such as preferably plywood or also presswood. Since an additional stiffening framing for securing a stable upright position of the targets under firing conditions no longer is needed, this results of course in a respectively lighter weight of the targets and also in an easier handling which must be secured for a frequent interchange of such targets during the course of military infrared firing exercises.

Figure 4:
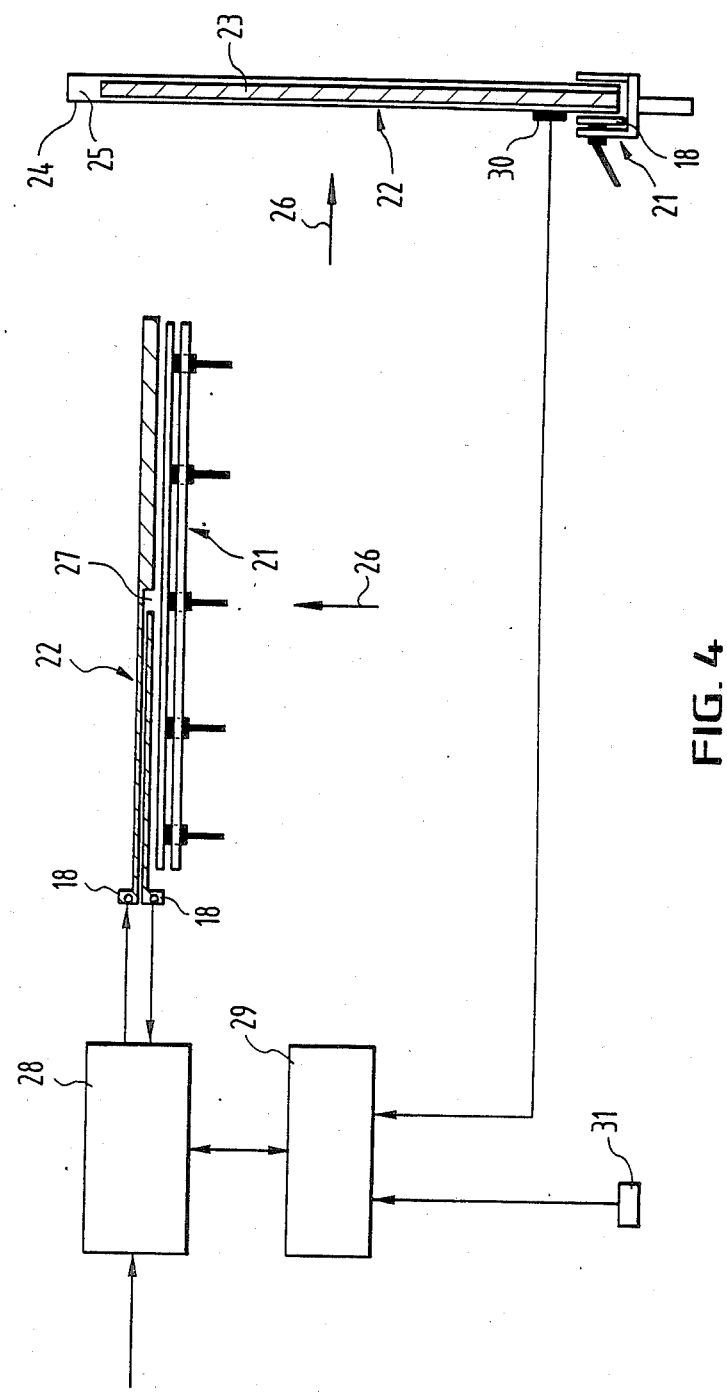
FIG. 4 is a schematic diagram showing the entire target system according to a preferred embodiment of the invention.

Turning now to FIG. 4 of the drawing showing schematically the entirety 21 of the before described clamping device in a plan view as well as in a side view, the inventive target system has to be understood such that with this clamping device 21 targets 22 one at a time are to be interchangeably arranged for being fired in the direction of the arrow 26 which corresponds with the direction of the double arrow 6 shown in FIG. 1. For allowing its observation in the course of an infrared firing exercise at night, each target 22 when being arranged in an upright position has to deliver a uniformly spread heat radiation of a temperature of at least one degree Celsius higher than the temperature of the surrounding atmosphere over the entire period of a firing exercise which on the other side has to be interrupted either for an interchange or for a re-heating of the targets as soon as this elevated heat radiation is no longer existent. For allowing an extended and in respect to the uniformity of its heat radiation at the same time improved use, each target 22 comprises a wooden carrier material formed as a plate 23 of a uniform thickness which is covered with a relatively thin metallic layer 24 that forms an electrically conductive resistance material. The wooden plate 23 is either a plywood or a presswood board having a thickness of about 9 mm for the larger sized targets which for the above reasons will not need any additional stiffening framing which a clamping device with curved clamping jaws of the kind referred is being used for the holding of these targets. For the embodiment shown in FIG. 4 the metallic layer 24 of each target 22 comprises a foil made of an aluminum alloy which with a turnover 25 at one edge portion of the wooden plate 23 is laminated onto both surfaces of the same. The one layer of the foil 24 forming the front or firing face of each target 22 is further divided into two equally sized portions as mutually separated by a scratching 27 being formed in such a manner that these two portions still remain electrically interconnected in series at the turnover portion 25 of the foil 24 and thereby of course also by the inclusion of its other layer. By the provision of such two portions as electrically connected in series—or for an alternative embodiment of such targets possibly also in parallel—an effective heating of the foil 24 now is made possible simply by applying an electric current through the two copper rails 18 forming the clamping face 1' of the one clamping jaw 1 of the clamping device 21 and therefore receiving automatically an electric contact with the aluminum foil forming as a metallic layer of each target an electric heating means of the same which therefore is capable of delivering a uniformly distributed heat radiation over an extended period of time.

The electric heating circuit which is connected to the two copper rails 18 forming a clamping face of the clamping device 21 comprises a source of current and in addition thereto as schematically shown in FIG. 4 a transformer 28 or any other suitable voltage regulator by means of which the supplier voltage of the current source being selectively either a battery voltage of for example 24 Volt or a line voltage of either 110 Volt or 220 Volt will receive a downward transformation to a value of about 1 Volt for the smaller targets and to a value of about 6 Volt for the larger ones. By this downward transformation of the supplier voltage the heating current, as supplied through the copper rails 18 to the metallic layer of the targets forming an electric heating means, will receive a corresponding upward transformation to thereby secure a correspondingly faster upheating of the metallic layer of each target 22 with a relatively small amount of power consumption. The downwardly transformed voltage of the heating current secures at the same time a relatively safe handling of the targets at the time when they are exchanged on the clamping device because if it then should have been overlooked to switch off the heating circuit this downwardly transformed voltage of about 6 Volt at the maximum will cause no injuries. As further schematically shown in FIG. 4 the heating circuit may in addition also comprise a comparison circuit 29 as formed with a first sensor 30 and a second sensor 31 being arranged for continuously measuring the temperature of the metallic layer of the targets during their use over a firing period and of the surrounding atmosphere, respectively. This this comparison circuit 29 when provided is connected to the heating circuit in such a manner that any first upheating of the targets will be stopped as soon as a heat radiation with any desired predetermined temperature difference relative to the surrounding atmosphere has been reached. In continuously comparing the two temperature values as measured by the sensors 30 and 31, this comparison circuit 29 will re-start this upheating as soon as the difference has reduced to a value which no longer will secure a clear observation of the targets. For this control any suitable control circuit has additionally to be connected to the comparison circuit. Such a control circuit may also featurize a control of the heating circuit in a generally pulsating manner alternately with an OFF time and and ON time as a provision for a further reduction of the power consumption.

Figure 5:
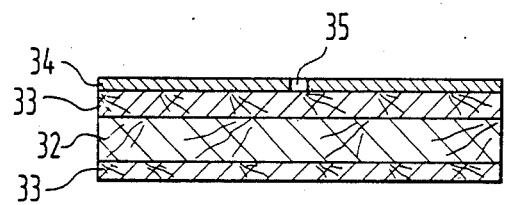
FIG. 5 is a sectional view of a target according to a second embodiment of the present invention.

With a target system of the kind as described before a plurality of military infrared firing exercises have been absolved whereby targets of the most critical size of about 1.80 m×2.30 m simulating the shape of a tank were used in a manner as prescribed under the current NATO regulations. The targets were formed as the before described targets 22 and comprised each a plywood board 23 with a thickness of 9 mm and covered on both surfaces with an aluminum foil 24 with a thickness between 20 and 60 µm. Other targets used for these firing exercises had a presswood board or a laminated board as a wooden carrier material whereby the laminated board as shown in FIG. 5 consisted of a core layer 32 of pine wood and two veneer layers 33 of sprucewood. The laminated boards of this composition were obtained from an ordinary production line which originally was installed for the continuous manufacturing of laminated boards incorporating also an aluminum foil as a centrally arranged steam barrier. This production line was altered in such a manner that the aluminum foil instead of receiving a central arrangement was laminated onto the one veneer layer 33 as also shown at 34 in FIG. 5. The aluminum foil 34 also received two equally sized portions by means of a scratching 35 in correspondence accordingly with the scratching 27 whereby this scratching 35 was intermittently produced with the same ripping saw by which in such ordinary production lines the individual boards are successively severed from the continuously manufactured fleece. For a further alternative the targets of this kind received with a different arrangement of the copper rails 18 a parallel heating of the two portions of their aluminum layer. All firing exercises with targets of these different kinds were conducted under an average temperature of 18° C. of the surrounding atmosphere and with a starting temperature of about 28° to 30° C. of the aluminum foil of the targets which was obtained by the supply of a heating current with a downwardly transformed voltage of about 6 Volt over an average time of about 25 seconds. After this time the primary heating was stopped for then allowing a firing at the targets. Subsequently to this primary heating the targets were only at those times a re-heated over pulsating periods between 20 and 40 seconds when their heat radiation had dropped to a value of about 24° C. With these data an average current consumption of 38 Amperes could be measured rendering an average current output of 126 Watt/m$^2$ for such targets. The targets continuously supplied a uniformly distributed heat radiation until the end of each firing period which as an average was determined with the timing for each target corresponding to 40 penetrations each of a diameter of about 120 mm.

The firing exercises with these larger sized targets were partwise also conducted in such a manner that portions of the metallic layer were painted with a colour or alternatively covered with a material that reduced the heat radiation to such an extent that these covered portions no longer could be observed by the gunners. It is therefore basically possible to use such larger sized targets also for the simulation of any smaller sized contour of objects other than a tank.

What is claimed is:

1. A target system for use in infrared firing exercises comprising:
   a. a plurality of targets, each of a wooden carrier material formed as a plate of uniform thickness which is covered on a front surface with a thin metallic layer of electrically conductive resistance material having substantially the same area size as the plate front surface, said material having a break which divides the front area into two sections;
   b. a plurality of clamping devices, each having a fixed jaw and a movable jaw, for interchangeably holding said targets one at a time at an edge portion of said sections, at least one of said clamping jaws of each clamping device being provided with an electrically conductive heating rail; and
   c. a source of current for supplying heating current to each of said two sections of front metallic layer along the length of said edge portion clamped between the jaws of said clamping devices, said heating current being supplied through a voltage step-down current step-up transformer.

2. A target system according to claim 1 wherein a metallic layer of electrically conductive resistance material also covers the rear surface of said plate, said front and rear metallic layers being connected along a free edge portion of the plate, said heating current being supplied in series to said two front sections of metallic layer.

3. A target system according to claim 1 wherein said clamping jaws of said clamping device and said heating rails are provided with complementary curvatures uniformly extending along the entire clamping length of said one edge portion of the targets, the curvatures extending at right angles with respect to the direction of movement of the movable clamping jaw and being chosen such in relation to the overall thickness of the targets that the free edge portion of the target opposite to the clamped edge portion has a substantially straight extension.

4. A target system according to claim 1 wherein said wooden carrier material comprises plywood board and wherein said metallic layer comprises a foil made of an aluminum alloy and laminated onto at least one surface of said plywood board.

5. A target system according to claim 1 further comprising:
   a comparison circuit formed with a first and a second sensor arranged for electrically measuring the temperature of the metallic layer and of the surrounding atmosphere, respectively, said comparison circuit being connected to the heating current source in such a manner as to control the heating of the metallic layer within predetermined limits of the difference between the measured temperatures.

6. A target system according to claim 5 wherein a control circuit is connected to said comparison circuit for controlling the heating circuit in a pulsating manner with an OFF time and alternately with an ON time.

7. A target system according to claim 1 wherein a T-handle cam mechanism is connected to a fixed jaw of said clamping device for camming a movable jaw into closed position.

8. A target system according to claim 7 wherein all T-handle mechanisms are supported by a common third jaw extending in parallel to said two clamping jaws one of which is movably connected to this third jaw by means of leaf springs in such a manner as to obtain a biased spread-apart position of this one clamping jaw relative to the second clamping jaw.

9. A target system according to claim 7 wherein each T-handle mechanism comprises an excentrically support swivel member which in a spread-apart position and in a clamping position of the two clamping jaws is provided with a line contact and with a planar contact, respectively, with one of said two clamping jaws.

10. A target system according to claim 1 wherein said heating current is provided with a downwardly transformed voltage of about 1 Volt to about 6 Volt.

11. An infrared target comprising:
   a. a support member comprising a thin plate of wood, said support member having a base edge;
   b. a thin metallic foil covering substantially the entire area of the front surface of said support member, said foil on said front surface having a break normal to said base edge, said break dividing said front surface into left and right sections of foil of substantially equal area;
   c. metallic foil on the rear surface of said wood plate interconnecting said left and right sections;
   d. a series of clamping devices at spaced-apart positions along the base edge of said target on each side of said break in said foil, each of said clamping devices having at least two jaws clamping the base edge of said target therebetween;
   e. a metallic rail connected to an inner surface of at least one jaw of each clamping device for making contact with said foil;
   f. a power supply including a voltage step-down current step-up transformer, said transformer having one output terminal connected to metallic rails at the left section of said target and its other output terminal connected to metallic rails at the right section of said target for supplying sufficient current to heat said foil quickly to a temperature above ambient and to cause infrared radiation.

12. Apparatus according to claim 11 wherein each of said jaws and each of said metallic rails has a curvature causing said lower edge of said foil-surfaced plate to have a continuous curvature, thereby to put the rear surface in tension and to give said foil-surfaced plate sufficient rigidity and stiffness to function as a target without use of vertical or diagonal stiffening ribs, the edge of said target opposite said base edge remaining substantially straight.

13. Apparatus according to claim 12 wherein said wooden plate has a thickness of 9 millimeters and wherein said foil has a thickness of 20 to 60 micrometers.

* * * * *